Patented Sept. 5, 1939

2,171,550

UNITED STATES PATENT OFFICE 2,171,550

PROCESS FOR REPLENISHING AND SUPPLEMENTING ESTER AND ALCOHOL ENTRAINER CONTENT IN AZEOTROPIC DISTILLATION SYSTEMS

Jack J. Gordon, Kingsport, Tenn., assignor, by mesne assignments, to Eastman Kodak Company, Jersey City, N. J., a corporation of New Jersey No Drawing. Application July 25, 1936, Serial No. 92,688

6 Claims. (Cl. 202—42)

This invention relates to the dehydration and concentration of aqueous solutions containing aliphatic acids by azeotropic distillation with ester and alcohol entrainers and more particularly to replenishing and supplementing the entrainer content contained in such systems.

It is well known that aqueous solutions of aliphatic acids, such as aqueous acetic acid solutions, cannot be satisfactorily concentrated by ordinary distillation. Hence, such solutions are dehydrated or concentrated by means of azeotropic distillation processes employing entrainers or withdrawing agents. In my allowed co-pending applications 744,250 and 26,226, now Patents Nos. 2,049,440 and 2,049,441, I have shown a number of new entrainers of esters and alcohols, together with new processes and apparatus for employing these entrainers. As pointed out in my co-pending applications, when using my ester and alcohol entrainers in the several systems there disclosed, said systems may be run continuously.

In the several systems which I have disclosed, it will be noted that various procedure and apparatus have been provided to prevent losses of the ester and alcohol entrainer. For example, in systems of my allowed co-pending applications 744,250 and 26,226, now Patents Nos. 2,049,440 and 2,049,441, it will be noted that the waste water from the distillation step is passed through means for removing any ester and alcohol contained therein before the water is discarded.

In some systems, however, such recovery procedure might not be available. Also, all acid recovery systems may be subject to leaks and more or less mechanical losses. Hence, it is apparent that in operating various acid recovery systems with my new ester and alcohol entrainers, there may be instances wherein it is necessary or desirable that the entrainer content be increased, replenished, supplemented or otherwise altered.

In distillation systems employing my ester and alcohol entrainer, it may be desirable, as pointed out in Gordon and Bright co-pending application 26,227, that the ratio of alcohol to ester content be held at some predetermined ratio for the most satisfactory operation. Hence, it is apparent that in respect to the problem of replenishing or supplementing entrainer content, this fact should be kept in mind.

I have found a new and particularly satisfactory method for the replenishing or supplementing of ester and alcohol entrainer in azeotropic distillation systems for the dehydrating and concentrating of aqueous solutions containing at least one of the lower aliphatic acids, which method does not substantially interrupt operations.

This invention has as one object to provide a process for the dehydration and concentration of aliphatic acids with ester and alcohol entrainers wherein the entrainer content may be replenished or supplemented. Another object is to provide a method for forming and replenishing ester and alcohol entrainer in an aliphatic acid azeotropic distillation system and the operation of such system with the formed and replenished entrainer. Still another object is to provide a method for replenishing ester-alcohol entrainer in a continuous azeotropic distillation system for aqueous solutions containing aliphatic acids. Another object is to provide a process for replenishing or supplementing of propyl acetate-propyl alcohol or butyl acetate-butyl alcohol entrainer employed in the azeotropic distillation of aqueous solutions containing aliphatic acid. Other objects will appear hereinafter.

I have found that aliphatic ester and alcohol entrainer agents may be formed, replenished or supplemented in continuous azeotropic distillation systems for treating aqueous solutions of aliphatic acids by making suitable additions of the proper alcohol to the distillation system at a suitable rate of addition.

For a further understanding of my invention, reference is made to the following examples which are set forth merely for the purpose of illustration. Specific materials, such as butyl acetate and butyl alcohol or propyl acetate and propyl alcohol, which are described as entrainers in the following examples are not to be construed as limiting my invention, as my novel procedure may be applied to systems operating with various other ester-alcohol entrainers.

*Example 1*

A distillation unit of the type shown in my allowed co-pending applications 744,250 and 26,226, now Patents Nos. 2,049,440 and 2,049,441, operated as therein described, contained an original charge of approximately 15,000 pounds of entrainer. During a period of continuous operation, it was determined that the entrainer content required some replenishing in order to compensate for operating losses. The entrainer composition, as operating, comprised approximately 30% normal butyl alcohol and the balance predominantly normal butyl acetate; and it was desired that this entrainer ratio be approximately maintained.

Approximately 10-15 pounds per day of normal butyl alcohol was supplied to the azeotrope decanter. This addition was made at such a rate as not to greatly disturb the aforementioned alcohol-ester ratio. However in the event of disturbances of the ratio, it may soon be readjusted by means of by-passing a portion of the entrainer reflux to a lower portion of the distillation unit in accordance with the Gordon and Bright co-pending application 26,227.

By making the aforementioned alcohol additions which may amount to approximately .001% to 1% by weight of the original charge of entrainer, I find that the entrainer content considered as an entity may be kept at the desired quantity.

Should it be desired to increase the entrainer content of the system rather than merely replenish entrainer, correspondingly larger alcohol addition would be made. However, the rate of addition should not be increased to such an extent that the operation of the column is materially disturbed. While the alcohol addition has been described as being made to the azeotrope decanter, the alcohol may be added at various other points in the system, such as, for example, in the by-pass or reflux lines.

Example 2

A 20 plate column mounted on a steam-heated copper base heater was charged with glacial acetic acid by supplying a quantity thereof to the base heater. The base heater was raised to a temperature of approximately 120°. At this temperature the acid was refluxing from approximately the 12th plate. When this condition had become steady, liquid normal propyl alcohol was started in at the 4th plate. In a few minutes distillate started over at approximately 97° C. and the temperature rose to about 104° C. Distillate was returned to the column at about the 9th plate and the alcohol feed was continued until a predetermined amount had been introduced. Distillation was continued for a short period until the temperature of the column had dropped somewhat and the reaction water started to separate. At this time the return at the 9th plate was cut off. Distillate was then collected in a decanter at the head of the column. The alcohol feed was resumed slowly and dilute acetic acid of approximately 30% concentration was supplied in the vapor state to the 11th plate.

Weak acid was continuously fed into the vaporizer, and glacial acid was drawn from the base heater. The decanter overflow was returned to the column at the 20th plate. By this procedure, therefore, an azeotropic distillation system for concentrating aqueous acid with an ester and alcohol entrainer was placed in operation by means of supplying the system with only the alcohol corresponding to the desired ester-alcohol entrainer.

The operations remained steady during a number of days. However, the temperature of the azeotrope rose somewhat, indicating that ester losses, presumably through evaporation and sampling, had unbalanced the system so as to make it necessary that the contents of ester-alcohol entrainer be replenished. Also, the acid content of the water being discharged to waste rose to as much as 10-13% on some samples.

In order to accomplish this replenishment, a quantity of normal propyl alcohol was fed into the upper portion of the distillation system over a period of approximately five hours. The distillate temperature fell to that of normal operation, and the loss of acid in the waste water became reduced to about .1% to about 2%.

From the above description, it is apparent that I have provided a particularly useful method for keeping ester and alcohol azeotropic distillation systems at a high state of efficiency and in continuous operation. I have also provided a method for starting an azeotropic distillation system employing ester and alcohol entrainer with only alcohol corresponding to the desired ester-alcohol entrainer.

As already indicated, should it be desired not only to replenish the ester-alcohol entrainer, thereby making up for losses of entrainer, but also to increase the total quantity of entrainer in the system, a correspondingly larger quantity of alcohol would be gradually added in accordance with the procedure already described, as, for example, up to 3% by weight.

The above examples have been described particularly with respect to azeotropic systems operating with aqueous acetic acid in the neighborhood of 20-40%. Should it be desired to operate on a lower concentration of acid, thereby requiring the removal of a greater quantity of water, the total quantity of entrainer in the system may be increased by the aforementioned procedure of only adding alcohol to the system.

Although I have described my invention as operating on systems containing butyl acetate-butyl alcohol entrainer, or propyl acetate-propyl alcohol entrainer, similar procedure may be applied to the other ester-alcohol entrainers, such as isopropyl acetate and isopropyl alcohol, isobutyl acetate or secondary butyl acetate, or amyl acetate with the corresponding alcohols. Also, my invention may be applied to the replenishing or increasing the ester and alcohol content of distillation systems operating in conjunction with extraction such as, for example, the distillation system shown in Gordon and Conklin co-pending application 744,251 now Patent No. 2,129,684. Hence, my invention is not to be restricted, excepting insofar as is necessitated by the prior art and the spirit of the appended claims.

What I claim as my invention and desire to secure by Letters Patent of the United States is:

1. A method for controlling the entrainer content of a balanced azeotropic distillation system, employing a multicomponent entrainer comprising a major portion of aliphatic ester and a minor portion of aliphatic alcohol greater than 3% for dehydrating aqueous solutions containing at least one lower aliphatic acid, which comprises, of the several components in the system, gradually adding to the system from time to time during a 24-hour period, small amounts of the single component, aliphatic alcohol, for control and replenishment.

2. The method of controlling the entrainer content of a balanced distillation system for the dehydration of aqueous acetic acid solutions with a multi-component entrainer comprising a major portion of a 5-7 carbon atom ester and a minor portion, greater than 3%, of a 3-5 carbon atom alcohol, which comprises operating the distillation system with several thousand pounds of said multi-component entrainer, and treating the entrainer content during operation by gradually adding during a 24-hour period a quantity of a 3-5 carbon atom alcohol in an amount between approximately .001% to approximately 3% of the total weight of said ester and alcohol in the system at the time of the addition.

3. The method of controlling the entrainer content of a distillation system for the dehydration of aqueous solutions of aliphatic acids by means of a multi-component entrainer essentially comprised of a major portion of propyl acetate and a minor portion of propyl alcohol, greater than 3%, which comprises operating the distillation system with several thousand pounds of entrainer in the system, and controlling the entrainer content by adding from time to time during a 24-hour period, the single component, propyl alcohol, in an amount between approximately .001% to approximately 1% of the total weight of the acetate and alcohol in the system at the time of the addition.

4. The method of controlling the entrainer content of a distillation system for the dehydration of aqueous aliphatic acid solutions by means of a multi-component entrainer essentially comprised of a major portion of butyl acetate and about 30% butyl alcohol, which comprises operating the distillation system with several thousand pounds of the multi-component entrainer therein, and controlling the content of all of the components in the entrainer by adding the single component, butyl alcohol, in an amount between approximately 10-15 pounds per 24-hour day.

5. The method of controlling the entrainer content of a distillation system for the dehydration of aqueous solutions of aliphatic acids by means of entrainer essentially comprised of a major portion of amyl acetate and a minor portion of amyl alcohol greater than 3%, which comprises operating a distillation system with a predetermined weight of said amyl acetate and amyl alcohol entrainer, and controlling the entrainer content by adding from time to time during a 24-hour period a quantity of amyl alcohol in an amount between approximately .001% to approximately 1% of said predetermined amyl acetate and amyl alcohol weight.

6. A process for starting and operating a distillation column for the dehydration of aliphatic acids by means of a multi-component entrainer essentially comprised of a major portion of an ester of an aliphatic alcohol mixed with a quantity of said aliphatic alcohol greater than 3%, which comprises charging the distillation column with a quantity of concentrated aliphatic acid, feeding aliphatic alcohol to the lower portion of the column and into contact with at least a portion of the concentrated aliphatic acid, distilling materials from the column, condensing and returning as reflux to the column at least a portion of the distilled materials until the multi-component entrainer of the desired composition forms, suplying aqueous materials to be dehydrated containing at least one lower aliphatic acid to the column and from time to time during the operation of the column controlling the multi-component entrainer principally by adding only alcohol thereto.

JACK J. GORDON.